US010233130B2

(12) United States Patent
Enokido et al.

(10) Patent No.: US 10,233,130 B2
(45) Date of Patent: Mar. 19, 2019

(54) IRON-ION SUPPLY MATERIAL

(71) Applicant: JFE STEEL CORPORATION, Tokyo (JP)

(72) Inventors: Hirofumi Enokido, Tokyo (JP); Akio Sonobe, Tokyo (JP); Hiroshi Sugihara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 298 days.

(21) Appl. No.: 15/106,429

(22) PCT Filed: Nov. 14, 2014

(86) PCT No.: PCT/JP2014/005747
§ 371 (c)(1),
(2) Date: Jun. 20, 2016

(87) PCT Pub. No.: WO2015/097975
PCT Pub. Date: Jul. 2, 2015

(65) Prior Publication Data
US 2018/0194696 A1    Jul. 12, 2018

(30) Foreign Application Priority Data

Dec. 24, 2013 (JP) .................................. 2013-266032

(51) Int. Cl.
C05D 9/02 (2006.01)
C01G 49/08 (2006.01)
C05G 3/06 (2006.01)
A01G 22/22 (2018.01)
A01G 7/06 (2006.01)
C05G 3/00 (2006.01)

(52) U.S. Cl.
CPC ................. C05D 9/02 (2013.01); A01G 7/06 (2013.01); A01G 22/22 (2018.02); C01G 49/08 (2013.01); C05G 3/0052 (2013.01); C05G 3/06 (2013.01)

(58) Field of Classification Search
None
See application file for complete search history.

(56) References Cited

U.S. PATENT DOCUMENTS

| 3,627,506 | A | * | 12/1971 | Tazelaar et al. | ......... | C05D 9/02 71/1 |
| 3,897,236 | A | * | 7/1975 | Roberts | ..................... | C03C 3/16 423/305 |
| 4,028,088 | A | * | 6/1977 | Young | ....................... | C05C 1/00 423/396 |
| 4,116,663 | A | * | 9/1978 | Ballou | ..................... | C05D 9/02 47/901 |
| 4,670,288 | A | * | 6/1987 | Ikari | ...................... | A01N 59/16 106/15.05 |
| 2004/0237615 | A1 | * | 12/2004 | Green | ..................... | A01C 1/06 71/28 |
| 2004/0250582 | A1 | * | 12/2004 | Ambri | ..................... | C03C 3/064 71/31 |
| 2014/0109636 | A1 | * | 4/2014 | Jessop | .................... | A01N 25/00 71/7 |
| 2017/0096377 | A1 | * | 4/2017 | Immelman | .............. | C05D 9/02 |

FOREIGN PATENT DOCUMENTS

| JP | 2001226179 | 8/2001 |
| JP | 2011160801 | 8/2011 |
| JP | 2013177271 | 9/2013 |
| WO | 2007013219 A1 | 2/2007 |
| WO | 2012060438 | 5/2012 |

OTHER PUBLICATIONS

Hackh's Chemical Dictionary, Fourth Edition (1969), McGraw-Hill, Inc., p. 543.*
Kataoka, I., et al., "Hydrogen Sulfide Capture Ability of Additional Soil Material for Aging Rice," Research Reports of Kochi University, 1958, p. 1-14, vol. 7(6).
International Search Report and Written Opinion of the International Searching Authority for International Application PCT/JP2014/005747 dated Jan. 27, 2015.
Japanese Office Action dated Apr. 5, 2016 for Japanese Application No. 2013-266032, including Concise Statement of Relevance.
Canadian Office Action for Application No. 2933658, dated May 10, 2017, 4 pages.
Korean Office Action for Korean Application No. 10-2016-7017980, dated Oct. 22, 2018 with Concise Statement of Relevance of Office Action, 5 pages.

* cited by examiner

Primary Examiner — Wayne A Langel
(74) Attorney, Agent, or Firm — RatnerPrestia

(57) ABSTRACT

An iron-ion supply material capable of efficiently supplying iron ions to plants is provided. An iron-ion supply material that acts as an iron-ion supply source for supplying iron ions contributing to plant growth comprises an iron powder having an iron content of 80% by mass or more, wherein 50% by mass or more of the whole iron powder has a particle size of 100 μm or more and 10 mm or less.

4 Claims, No Drawings

IRON-ION SUPPLY MATERIAL

CROSS REFERENCE TO RELATED APPLICATIONS

This is the U.S. National Phase application of PCT/JP2014/005747, filed Nov. 14, 2014, which claims priority to Japanese Patent Application No. 2013-266032, filed Dec. 24, 2013, the disclosures of each of these applications being incorporated herein by reference in their entireties for all purposes.

TECHNICAL FIELD

The disclosure relates to an iron-ion supply material, and particularly relates to an iron-ion supply material capable of efficiently supplying iron ions to plants.

BACKGROUND

Iron is one of the 16 elements essential for plant growth. Iron combines with a number of electron transfer proteins or enzyme proteins, as heme iron such as cytochromes or non-heme iron such as ferredoxins which are involved in redox reactions or biosynthetic reactions in many plants such as photosynthesis, respiration, nitrogen assimilation, and nitrogen fixation.

Plants absorb iron as bivalent iron ions. When plants cannot absorb bivalent iron ions, the growth of shoots is hindered as in the case of yellowing of rice, etc., and productivity declines. In degraded paddy fields, the concentration of bivalent iron ions in the plowed soil is low. If fertilizers containing sulfate ions such as ammonium sulfate are heavily used in such plowed soil, the generated sulfide is unremoved as iron sulfide, and rice roots are damaged by hydrogen sulfide (for example, see Non-patent Literature (NPL) 1). For healthy plant growth, it is important to stably and sustainably supply bivalent iron ions to plants.

Various techniques for stably supplying bivalent iron ions to plants have been proposed. For example, Patent Literature (PTL) 1 describes a technique for long-term and stable supply of soluble iron by using an iron-ion supply material that includes: an iron oxide and/or metallic iron-containing substance; and an organic acid which is gluconic acid or glutamic acid.

CITATION LIST

Patent Literature

PTL 1: JP 2011-160801 A

Non-Patent Literature

NPL 1: Research reports of Kochi University, vol. 7, no. 6, p. 187 (1958)

SUMMARY

Technical Problem

However, it was found that when we cultivated a plant, for example, rice, using the iron-ion supply material described in PTL 1, iron ions were not efficiently supplied to the rice and the rice yield did not increase as expected.

Therefore, the purpose of the present invention is to provide an iron-ion supply material capable of efficiently supplying iron ions to plants.

Solution to Problem

As a result of studying how to solve the stated problem, we discovered that it is highly effective to compose an iron-ion supply material of an iron powder that has a high iron content and whose particle size is adjusted within an appropriate range.

We thus provide the following.

(1) An iron-ion supply material that acts as an iron-ion supply source for supplying iron ions contributing to plant growth, the iron-ion supply material comprising an iron powder having an iron content of 80% by mass or more, wherein 50% by mass or more of the whole iron powder has a particle size of 100 μm or more and 10 mm or less.

(2) The iron-ion supply material according to the foregoing (1), wherein the iron powder is an atomized iron powder.

(3) The iron-ion supply material according to the foregoing (1) or (2), wherein the iron powder has an oxygen content of 0.4% by mass or more and 1.5% by mass or less.

(4) The iron-ion supply material according to the foregoing (3), wherein the iron powder has an oxygen content of 0.6% by mass or more and 1.2% by mass or less.

Advantageous Effect

The disclosed iron-ion supply material comprises an iron powder that has an iron content of 80% by mass or more and whose particle size is 100 μm or more and 10 mm or less. By placing such an iron-ion supply material having a high iron concentration near plant roots, bivalent iron ions can be efficiently supplied to plants.

DETAILED DESCRIPTION

The following describes one of the embodiments. The disclosed iron-ion supply material is an iron-ion supply material that acts as an iron-ion supply source for supplying iron ions contributing to plant growth. Important features are that the iron-ion supply material comprises an iron powder having an iron content of 80% by mass or more, and 50% by mass or more of the whole iron powder has a particle size of 100 μm or more and 10 mm or less.

Since when the present inventors cultivated rice using the iron-ion supply material described in PTL 1 and failed to efficiently supply iron ions to the rice, the present inventors first investigated the cause in detail. The technique described in PTL 1 is based on the use of slag as an iron source, as mentioned above. Given that slag contains iron oxide, calcium oxide, and silicon dioxide as major components and has a low iron content, we initially regarded this low iron content as a main cause of the failure to efficiently supply iron ions to the plant.

We then used an iron powder as an iron source, and carried out a detailed study of the relationship between the iron content in the iron powder and the rice yield. As a result, in the case where the iron content in the iron powder was 80% or more, the rice yield increased and iron ions were more efficiently supplied to the rice. Given the amount of iron powder supplied, however, the rice yield was lower than originally expected. Accordingly, we further investigated the cause, and discovered that the iron powder was not always positioned properly when supplying iron ions to the rice.

In detail, the supplied iron powder was distributed widely in the depth direction of the paddy field, where iron particles with small particle sizes were mostly near the surface of the paddy field while iron particles with large particle sizes were deeper in the paddy field. Thus, much of the iron powder was found to be not near the rice roots where iron ions can be absorbed. We then studied how to place the iron powder near the roots of the plant so as to efficiently supply iron ions to the plant, and discovered that setting the particle size range of the iron powder to 100 μm or more and 10 mm or less is highly effective and also 50% by mass or more of the whole iron powder may be within this particle size range. The structure of the disclosed iron-ion supply material is described below.

The iron content in the iron powder is 80% by mass or more. The iron concentration in the iron powder is a primary factor affecting the efficiency in supplying iron ions to plants. The technique described in PTL 1 is based on the use of slag, as mentioned above. This hinders efficient supply of iron ions to rice. According to the disclosure, on the other hand, the iron content in the iron powder is 80% by mass or more. This enables supply of a sufficient concentration of iron ions to plants. The use of conventional slag also has a problem in that the volume of the iron-ion supply material is large because the iron-ion supply material has a low iron ion content and contains many components other than iron ions. The disclosed iron-ion supply material has no such problem as it does not contain many components other than iron. The iron content is preferably 99% by mass, and more preferably 99.5% by mass.

The particle size of the iron powder is 100 μm or more and 10 mm or less. The particle size of the iron powder is a critical factor in placing the iron powder near plant roots to efficiently supply iron ions to plants, as mentioned above. The iron-ion supply material is supplied to the plant by being scattered in the field or by being mixed into the soil when plowing the field. In the case where the particle size of the iron powder is less than 100 inn, the iron powder may be blown away by wind and not settle in the area where the plant roots can absorb iron ions (e.g. the area of 0 cm (the earth's surface) to 100 cm in depth from the surface of the field). Even when the iron powder settles, the iron powder may be in the surface layer of the field away from the plant roots, and unable to efficiently supply iron ions to the plant. In the case where the particle size of the iron powder exceeds 10 mm, the iron powder is distributed deeper than the plant roots. In such a case, iron ions cannot be efficiently supplied to the plant even though the iron powder has a high iron content. For these reasons, the particle size of the iron powder is 100 μM or more and 10 mm or less. The particle size of the iron powder is preferably 100 μm or more and 5 mm or less, and more preferably 100 μm or more and 1 mm or less.

At least 50% by mass of the whole iron powder is in the aforementioned particle size range. Preferably 70% by mass or more, more preferably 90% by mass or more, and further preferably 100% by mass of the whole iron powder is in the aforementioned particle size range.

The particle size of the iron powder is adjusted using a sieve. In detail, the iron powder whose particle size is 100 μm or more and 10 mm or less is an iron powder that, after passing a 10 mm sieve and being put through a 100 μm sieve, remains on the 100 μm sieve.

The iron powder may be, for example, a reduced iron powder produced by reducing mill scale (iron oxide) with coke or the like (carbon material) and then heat-treating (reducing) it in a hydrogen atmosphere, or an atomized iron powder produced by powdering and cooling molten steel with high-pressure water and then heat-treating (reducing) it in a hydrogen atmosphere. Such an atomized iron powder need not necessarily be a pure iron powder, and may be an alloy iron powder. A reduced iron powder and an atomized iron powder typically have an iron content exceeding 99% by mass, and can efficiently supply bivalent iron ions to plants. Of these, an atomized iron powder is preferable for its low production cost.

When the disclosed iron-ion supply material is supplied to a field, bivalent iron ions leach into external water near the iron-ion supply material present around plant roots. The iron powder has a thin layer of iron oxide on its surface (with a crystal grain inside). The surface gets wet by external water, and bivalent iron ions leach from the iron oxide layer on the surface first. When bivalent iron ions leach further and the iron oxide layer disappears, the water permeates the crystal grain boundary inside the iron powder and the crystal grain gradually comes into contact with the water, as a result of which bivalent iron ions leach from the surface of the iron powder. The water permeates inside the iron powder, causing bivalent iron ions to leach further. Moreover, in the case where bivalent iron ions are oxidized to trivalent iron ions, they are reduced to bivalent iron ions by hydrogen present in the iron powder. By this principle, bivalent iron ions are supplied for the long term. In alkali soil, iron typically becomes poorly water-soluble ferric hydroxide $Fe(OH)_3$, which is hard to be absorbed by plants. However, hydrogen present in the iron powder reduces trivalent iron ions to bivalent iron ions, to be absorbable by plants.

The disclosed iron-ion supply material preferably has an oxygen concentration of 0.4% by mass or more and 1.5% by mass or less. When the particles of the iron powder contain oxygen, iron and oxygen react to form a film of triiron tetraoxide ($Fe_3O_4$), and this triiron tetraoxide acts as a bivalent iron-ion supply source. By setting the oxygen concentration to 0.4% by mass or more, triiron tetraoxide as a bivalent iron-ion supply source can be formed efficiently. In the case where the oxygen concentration is high, on the other hand, the oxygen concentration of the surface of the iron powder is high, that is, the iron oxide layer on the surface of the iron powder is thick. This interferes with the effect of water permeating the crystal grain boundary inside the iron powder and as a result bivalent iron ions leaching from around the crystal grain constituting the iron powder. The oxygen concentration is accordingly set to 1.5% by mass or less, to optimize the coverage and thickness of iron oxide on the surface. Thus, water permeates the crystal grain boundary inside the iron powder, so that bivalent iron ions can be supplied for the long term. The oxygen concentration is more preferably 0.6% by mass or more and 1.2% by mass or less.

Note that the "oxygen concentration of an iron powder" means the average oxygen concentration of the whole iron powder, which is measured by melting the iron powder by acid dissolution.

An atomized iron powder typically has an oxygen concentration of about 0.3% by mass. Therefore, the aforementioned oxygen concentration range is higher than the typical oxygen concentration of an atomized iron powder. An iron powder within the aforementioned oxygen concentration range can be obtained by omitting the final reduction process in the atomized iron powder production process, for example. An atomized iron powder is produced by powdering and cooling molten steel with high-pressure water and then heat-treating (reducing) it in a hydrogen atmosphere, as mentioned above. During cooling, a coating of triiron tetraoxide (Fe₃O₄) is formed on the surface of each iron particle, as a result of iron being oxidized by atmosphere gas (air) or a vapor boundary film formed between high-temperature droplets and water. This triiron tetraoxide acts as a bivalent iron-ion supply source, as mentioned above. Even after the triiron tetraoxide on the surface of each iron particle disappears, bivalent iron ions are continuously produced from pure iron, as mentioned above. The supply of bivalent iron ions to plants can be continued in this way. Normally, the coating is reduced by the heat treatment in the hydrogen atmosphere, as a result of which the oxygen concentration of the iron powder decreases. By omitting this heat treatment in the hydrogen atmosphere (i.e. the reduction process), the aforementioned iron powder having an oxygen content of 0.4% by mass or more and 1.5% by mass or less can be obtained.

To adjust the oxygen concentration in the atomized iron powder within the range of 0.4% by mass or more and 1.5% by mass or less, the oxygen concentration in the atmosphere gas in the powdering and cooling process may be adjusted.

By use of the disclosed iron-ion supply material, an iron-ion supply material having a high iron concentration can be placed near plant roots, with it being possible to efficiently supply bivalent iron ions to plants.

EXAMPLES (Production of Iron Powder)

The following describes examples according to the disclosure. To evaluate the iron-ion supply ability of the disclosed iron-ion supply material to plants, the iron powders having the iron contents, particle sizes, and oxygen concentrations shown in Table 1 were prepared first. Examples 1 to 14 and Comparative Examples 1 to 3 were atomized iron powders, and Example 15 was a reduced iron powder. The iron content of the iron powder of Comparative Example 1 was adjusted to 75% by mass. The particle size of the iron powder of Comparative Example 2 was adjusted to 0.09 mm or less. The particle size of the iron powder of Comparative Example 3 was adjusted to 11 mm or more and 15 mm or less. The particle size in Table 1 is defined as follows. For instance, the particle size in Example 1 is the particle size range of the iron powder that, after passing a 0.2 mm (upper limit) sieve and being put through a 0.1 mm (lower limit) sieve, remained on the 0.1 mm sieve. The iron powder of each of Examples 9 to 14 was produced with the reduction process in the atomized iron powder production process being omitted and the oxygen concentration of the iron powder being adjusted to the value shown in Table 1.

TABLE 1

|  | Iron source | Iron content (mass %) | Particle size (mm) | Oxygen concentration (mass %) | Rice yield weight per unit area |
| --- | --- | --- | --- | --- | --- |
| Comparative Example 1 | Atomized iron powder | 75 | 0.1 to 0.2 | 0.3 | 104 |
| Example 1 | Atomized iron powder | 80 | 0.1 to 0.2 | 0.3 | 108 |
| Example 2 | Atomized iron powder | 99 | 0.1 to 0.2 | 0.3 | 108 |
| Example 3 | Atomized iron powder | 99.5 | 0.1 to 0.2 | 0.3 | 109 |
| Comparative Example 2 | Atomized iron powder | 80 | 0.09 or less | 0.3 | 104 |
| Example 4 | Atomized iron powder | 80 | 0.2 to 0.4 | 0.3 | 112 |
| Example 5 | Atomized iron powder | 80 | 0.4 to 0.8 | 0.3 | 111 |
| Example 6 | Atomized iron powder | 80 | 0.8 to 2 | 0.3 | 110 |
| Example 7 | Atomized iron powder | 80 | 2 to 6 | 0.3 | 109 |
| Example 8 | Atomized iron powder | 80 | 6 to 10 | 0.3 | 108 |
| Comparative Example 3 | Atomized iron powder | 80 | 11 to 15 | 0.3 | 104 |
| Example 9 | Atomized iron powder | 98 | 0.1 to 0.2 | 0.4 | 110 |
| Example 10 | Atomized iron powder | 98 | 0.1 to 0.2 | 0.6 | 115 |
| Example 11 | Atomized iron powder | 98 | 0.1 to 0.2 | 1.0 | 117 |
| Example 12 | Atomized iron powder | 98 | 0.1 to 0.2 | 1.2 | 115 |
| Example 13 | Atomized iron powder | 98 | 0.1 to 0.2 | 1.5 | 111 |
| Example 14 | Atomized iron powder | 98 | 0.1 to 0.2 | 2.0 | 108 |
| Example 15 | Reduced iron powder | 80 | 0.1 to 0.2 | 0.3 | 107 |
| Conventional Example 1 | N/A | — | — | — | 100 |
| Conventional Example 2 | Molten slag | 30 | 10 to 50 | 30 | 101 |

(Evaluation of Rice Yield Weight)

Each of the prepared iron powders of Examples 1 to 15, Comparative Examples 1 to 3, and Conventional Examples 1 and 2 was scattered in a rice field and rice was cultivated, and the iron-ion supply ability for rice was evaluated based on the rice yield weight. The rice yield weight of each iron powder is quantified with the rice yield weight in the case of cultivating rice without iron powder supply (Conventional Example 1) being set to 100, where a larger value indicates a larger rice yield weight and a higher bivalent iron-ion supply ability.

As shown in Table 1, the iron powders of all Examples achieved an increase in rice yield weight of 5% or more as compared with Conventional Example 1. In the case where the iron powder was an atomized iron powder as in Examples 2, 3, and 9 to 14, the rice yield weight increased by 8% or more as compared with the conventional example using no iron powder. Moreover, in the case where the atomized iron powder had an oxygen concentration of 0.4% by mass or more and 1.5% by mass or less, the rice yield weight increased by 10% or more. In particular, in the case where the atomized iron powder had an oxygen concentration of 0.6% by mass or more and 1.2% by mass or less, the rice yield weight increased by 15% or more. This demonstrates that bivalent iron ions can be efficiently supplied to plants according to the disclosure.

INDUSTRIAL APPLICABILITY

The disclosed iron-ion supply material comprises an iron powder having an iron content of 80% by mass or more, and 50% by mass or more of the whole iron powder has a particle size of 100 μm or more and 10 mm or less. By placing such an iron-ion supply material having a high iron concentration near plant roots, bivalent iron ions can be efficiently supplied to plants. The disclosed iron-ion supply material is therefore useful for agriculture.

The invention claimed is:

1. An iron-ion supply material that acts as an iron-ion supply source for supplying iron ions contributing to plant growth, the iron-ion supply material comprising
   an iron powder having an iron content of 80% by mass or more,
   wherein 50% by mass or more of the whole iron powder has a particle size of 100 μm or more and 10 mm or less, and
   wherein the iron powder has an oxygen content of 0.4% by mass or more and 1.5% by mass or less.

2. The iron-ion supply material according to claim 1, wherein the iron powder is an atomized iron powder.

3. The iron-ion supply material according to claim 1, wherein the iron powder has an oxygen content of 0.6% by mass or more and 1.2% by mass or less.

4. The iron-ion supply material according to claim 2, wherein the iron powder has an oxygen content of 0.6% by mass or more and 1.2% by mass or less.

* * * * *